United States Patent
Sinkler et al.

(10) Patent No.: US 12,019,428 B2
(45) Date of Patent: Jun. 25, 2024

(54) REAL-TIME PLANT DIAGNOSTIC SYSTEM AND METHOD FOR PLANT PROCESS CONTROL AND ANALYSIS

(71) Applicant: UOP LLC, Des Plaines, IL (US)

(72) Inventors: Wharton Sinkler, Des Plaines, IL (US); Linda S. Cheng, Highland Park, IL (US); Paul Adams, Hartland, WI (US); James W. Harris, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 255 days.

(21) Appl. No.: 17/194,842

(22) Filed: Mar. 8, 2021

(65) Prior Publication Data

US 2021/0200195 A1 Jul. 1, 2021

(51) Int. Cl.
| | |
|---|---|
| G05B 19/418 | (2006.01) |
| C10G 7/00 | (2006.01) |
| C10G 7/12 | (2006.01) |
| C10G 11/18 | (2006.01) |
| G01N 30/00 | (2006.01) |
| G05B 23/02 | (2006.01) |

(52) U.S. Cl.
CPC ........... *G05B 19/4183* (2013.01); *C10G 7/00* (2013.01); *C10G 7/12* (2013.01); *C10G 11/187* (2013.01); *G01N 30/00* (2013.01); *G05B 23/0272* (2013.01)

(58) Field of Classification Search
CPC .......... C10G 7/12; C10G 7/00; C10G 11/187; G01N 30/00; G05B 19/4184; G05B 19/418; G05B 19/4138; G05B 23/0272; G05B 23/0243; Y02P 90/02
See application file for complete search history.

(56) References Cited

U.S. PATENT DOCUMENTS

| | | | |
|---|---|---|---|
| 5,470,482 A | 11/1995 | Holt | |
| 8,884,092 B2 | 11/2014 | Rauch et al. | |
| 9,053,260 B2 | 6/2015 | Romatier et al. | |
| 10,222,787 B2 | 3/2019 | Romatier et al. | |
| 11,022,963 B2* | 6/2021 | Romatier | G05B 19/4184 |
| 2019/0155259 A1* | 5/2019 | Romatier | G05B 23/0294 |

FOREIGN PATENT DOCUMENTS

| | | | | |
|---|---|---|---|---|
| WO | WO 2013090999 A1 * | 6/2013 | ........ | A61M 16/0051 |
| WO | 2019028269 A2 | 2/2019 | | |

OTHER PUBLICATIONS

Bishnu P. Regmi et al., Micro Gas Chromatography: An Overview of Critical Components and Their Integration, Analytical Chemistry, Anal. Chem. 2018, 90, 13133-13150.
Office Action for corresponding Indian Application No. 202217063754.

* cited by examiner

*Primary Examiner* — Tung S Lau
(74) *Attorney, Agent, or Firm* — Paschall & Associates, LLC; Mark Goldberg

(57) ABSTRACT

A plant diagnostic system and method for plant process control and analysis comprising one or more sensors configured to collect and report compositional operation information of the equipment in the plant or refinery in real-time. At least one of the one or more sensors may be selected from a group of GC, GCxGC, micro GC, micro GCxGC, or combinations thereof. The diagnostic system may comprise a detection platform, an analysis platform, a visualization platform, and/or an alert platform.

16 Claims, 4 Drawing Sheets

REAL-TIME PLANT DIAGNOSTIC SYSTEM AND METHOD FOR PLANT PROCESS CONTROL AND ANALYSIS

This application claims priority from application 63/022,029, filed May 8, 2020.

FIELD

This disclosure is related to a method and system for controlling the operation of a plant, such as a chemical plant or a refinery, and more particularly, real-time diagnostic systems for managing plant process control and analysis using compositional sensors.

BACKGROUND

A diagnostic system for monitoring a refinery unit is a feature of controlling the operation of the plant for early detection of fault conditions or a compositional measurement that is outside of a predetermined range. Facilitating a troubleshooting or corrective action for correcting the faulty condition or a compositional measurement that is outside of a predetermined range is a difficult task for a plant operator. A timely and prompt corrective action is needed to save operational expenses and time for an enhanced outcome of the plant. In certain cases, reviewing data related to the faulty condition or a compositional measurement that is outside of a predetermined range on a periodic basis is a time-consuming, complicated, and difficult process for the plant operator.

Conventional diagnostic systems lack the ability to provide analysis reports rapidly, in real-time, and mechanisms for direct and specific analysis notifications to the plant operator.

Conventional methods, mechanisms, sensors, and apparatuses do not provide direct and specific diagnostic analysis of a chemical process, which are necessary to promptly identify a root cause of a faulty condition or a compositional measurement that is outside of a predetermined range. Promptly identifying the root cause of the faulty condition, undesired measurements, or operational gaps may significantly reduce the operational expenses and time.

There remains a need for a diagnostic system and sensors that provide direct and specific diagnostic analysis of a chemical process in real-time.

SUMMARY

A general objective of the disclosure is to improve diagnostic operation efficiency of plants and refineries. A more specific objective of this disclosure is to overcome one or more of the problems described above. A general objective of this disclosure may be attained, at least in part, through a method for improving operation of a plant. The method may comprise obtaining direct and specific plant operation information from the plant in real-time.

In one embodiment of the present disclosure a method for improving operation of a plant may comprise obtaining plant operation information in real-time from the plant and generating a plant process model using direct and specific plant operation information. The model may be an outcome based business model that can improve process unit control. The method may comprise receiving plant operation information over the internet and automatically generating a plant process model using the direct and specific plant operation information.

In another embodiment of the present disclosure, compositional analysis may be used to monitor and/or optimize performance of individual process units, operating blocks and/or complete processing systems. Routine and frequent analysis of actual performance allows early identification of operational discrepancies which may be acted upon to optimize impact.

In another embodiment of the present disclosure, the method of obtaining plant operation information may comprise using a web-based computer system or platform. The benefits of executing work processes within a web-based computer system or platform comprise improved plant performance due to an increased ability by operations to identify and capture opportunities in real-time, a sustained ability to bridge performance gaps in real-time, and improved enterprise management.

In another embodiment of the present disclosure, a data collection system at a plant may capture direct and specific data that may be automatically sent to a remote location, where it may be processed to, for example, eliminate errors and biases, and may be used to calculate and report performance results. The performance of the plant and/or individual process units of the plant may be compared to other process models created by the plant to identify any operating differences or gaps.

In another embodiment of the present disclosure, a diagnostic report, such as a daily report, showing actual performance may be generated and delivered to one or more devices, via, for example, the internet or other wireless communication means. Any identified performance gaps or differences may be associated with the cause of the gaps during the processing of the data collected by the data collection system. Any identified performance gaps may be used to resolve the performance gaps. The method may comprise using other plant process models and operation information to run optimization routines that converge on an optimal plant operation for the given values of, for example, feed, products, and prices.

In another embodiment of the present disclosure, the method may comprise automatically generating recommendations to adjust process conditions allowing the plant to run continuously at or closer to optimal conditions. The method may provide one or more alternatives for improving or modifying the operations of the plant. The method may regularly maintain and/or tune the process models to correctly represent the true potential performance of the plant based on one or more signals and parameters related to the operations of the plant. In one or more embodiments, the method may include optimization routines configured according to specific criteria, which may be used to identify optimum operating points, evaluate alternative operations, and/or perform feed evaluations.

In another embodiment of the present disclosure, a repeatable method that will help refiners bridge the gap between actual and achievable performance may be used. The method may use process development history, modeling and stream characterization, and plant automation experience to protect data security, and efficiently aggregate, manage, and move large amounts of data. Web-based optimization may be an enabler to achieving and sustaining maximum process performance by connecting, on a virtual basis, technical expertise and the plant process operations staff in real-time.

In another embodiment of the present disclosure, an enhanced workflow may be implemented and comprise using configured process models to monitor, diagnose, predict, and/or optimize performance of individual process units, operating blocks, or complete processing systems in real-time.

As used herein, references to a "routine" are to be understood to refer to a computer program or sequence of computer programs or instructions for performing a particular task. References herein to a "plant" are to be understood to refer to any of various types of chemical manufacturing or refining facilities. References to "chemical" includes "petrochemical". References herein to a plant "operators" are to be understood to refer to and/or include, without limitation, plant planners, managers, engineers, technicians, and others interested in, overseeing, and/or running the daily operations at a plant.

The foregoing and other aspects and features of the present disclosure will become apparent to those of reasonable skill in the art from the following detailed description, as considered in conjunction with the accompanying drawings.

DETAILED DESCRIPTION

Figure 1:
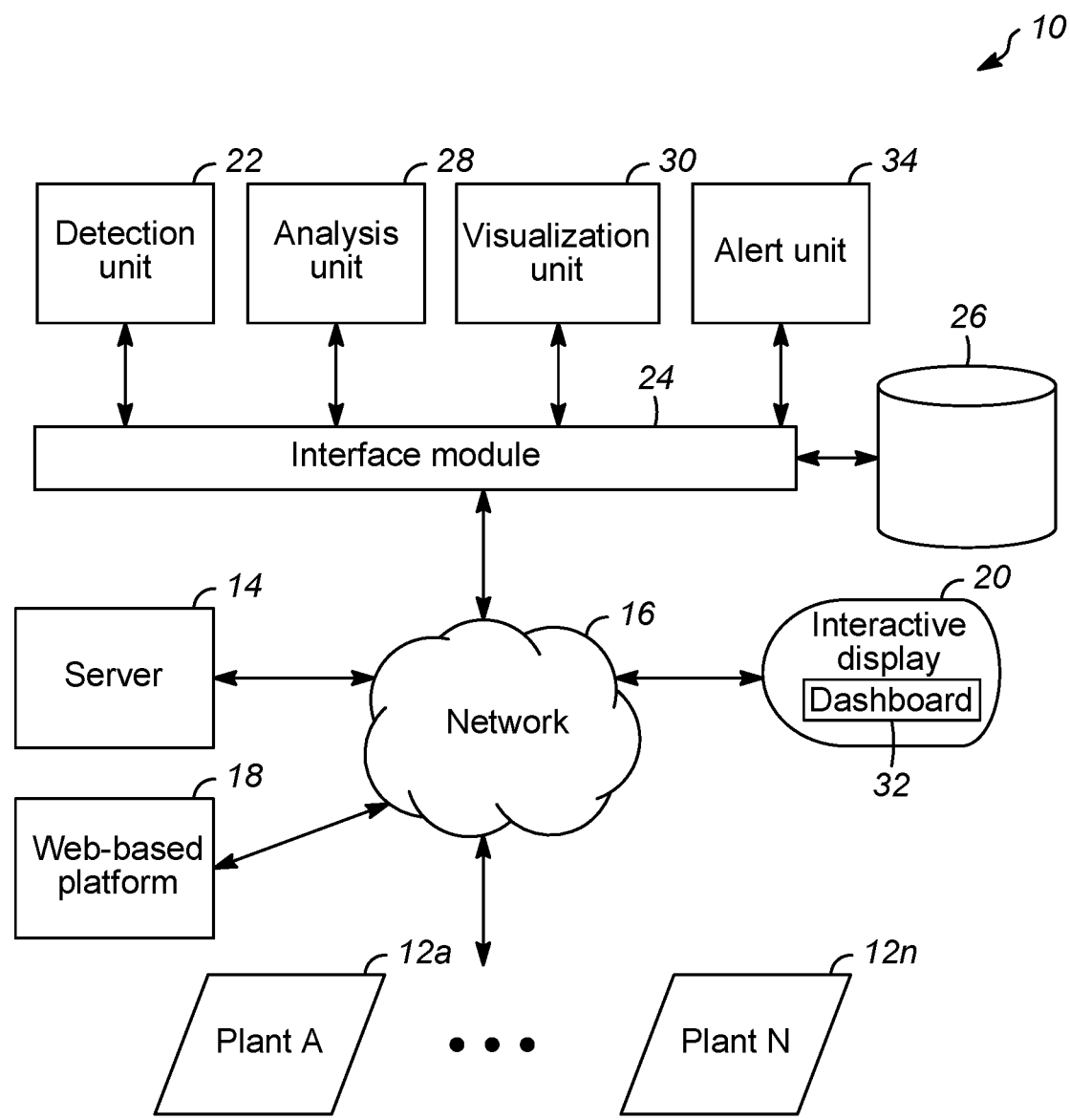
FIG. 1 depicts an illustrative functional block diagram of a diagnostic system in accordance with one or more embodiments of the present disclosure.

The following detailed embodiments presented herein are for illustrative purposes. That is, these detailed embodiments are intended to be exemplary of the present invention for the purposes of providing and aiding a person skilled in the pertinent art to readily understand how to make and use the present invention.

Accordingly, the detailed discussion herein of one or more embodiments is not intended, nor is it to be construed, to limit the boundaries of the descriptions but rather as defined by the claims and equivalents thereof. Therefore, embodiments not specifically addressed herein, such as adaptations, variations, modifications, and equivalent arrangements, should be and are considered to be implicitly disclosed by the illustrative embodiments and claims set forth herein and therefore fall within the scope of the present invention.

Further, it should be understood that, although steps of various claimed methods may be shown and described as being in a sequence or temporal order, the steps of any such method are not limited to being carried out in any particular sequence or order, absent an indication otherwise. That is, the claimed method steps are considered capable of being carried out in any sequential combination or permutation order while still falling within the scope of the present invention.

Additionally, it is important to note that each term used herein refers to that which a person skilled in the relevant art would understand such term to mean, based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. Also, the term "or" denotes "at least one of the items," but does not exclude a plurality of items of the list.

In the description which follows, like parts are marked throughout the specification and drawings with the same reference numerals, respectively. The drawing figures may not necessarily be to scale and certain features may be shown in somewhat schematic form in the interest of clarity and conciseness.

Referring now to FIG. 1, an illustrative diagnostic system, generally designated 10, using one or more embodiments of the present disclosure is provided for improving operation of one or more plants (e.g., Plant A . . . Plant N) 12a-12n, such as a chemical plant or refinery, or a portion thereof. The diagnostic system 10 may use plant operation information obtained from at least one plant of the one or more plants 12a-12n, which may be the current plant (e.g., Plant A) 12a, other third party or customer plants (e.g., Plant N) 12n, and/or proprietary services, subsidiaries, and the like.

As used herein, the terms "system," "unit," or "module" may refer to, be part of, or include an Application Specific Integrated Circuit (ASIC), an electronic circuit, a memory (shared, dedicated, or group) and/or computer processor (shared, dedicated, or group) that executes one or more software or firmware programs, a combinational logic circuit, and/or other suitable components that provide the described functionality.

Thus, while this disclosure comprises particular examples and arrangements of the units, the scope of the present system is not so limited, since other modifications will become apparent to the skilled practitioner. The software programs may be written in HTML5, CSS3, Java, JavaScript, PHP, HTML, C, C++, C #, AJAX, Python, Ruby, Perl, Objective-C, .NET, SQL, Ruby on Rails, Swift, Rust, Elixir, Go, Typescript, or one or more other suitable computer programming language.

The diagnostic system 10 may reside in or be coupled to a server or computing device 14 (including, e.g., database servers, video servers), and may be programmed to perform tasks and/or cause display of relevant data for one or more different functional units. Some or all relevant information may be stored in one or more databases for retrieval by the diagnostic system 10 or the computing device 14 (e.g., a data storage device and/or a machine-readable data-storage medium carrying computer programs).

The numerous elements of the diagnostic system 10 may be communicatively coupled through one or more networks (e.g., network 16). For example, the numerous platforms, devices, sensors, and/or components of the computing system environment illustrated in FIG. 1 may be communicatively coupled through a private network. The sensors may be positioned on various components in the plant and may communicate wirelessly or wired with one or more platforms. The sensors may be positioned or located in all key unit operations, such as chemical conversion units, separation units, and process devices. Chemical conversion units can be reactors, including hydroprocessing units, cracking units, and reforming units, furnaces, catalyst regenerators, and absorbance units. Separation units can be fractionation columns, and distillation columns, filtration, sedimentation, decantation, and crystallization units. Process devices can be any equipment employed in a chemical plant that is not a separation unit or a chemical conversion unit, such as pumps, compressors, heat exchangers, control valves, lines in fluid communication with said at least one chemical conversion unit or at least one separation unit and/or other process equipment commonly found in the refining and chemical industry.

The private network may comprise, in some examples, a network firewall device to prevent unauthorized access to the data and devices on the private network. Alternatively, the private network may be isolated from external access through physical means, such as a hard-wired network with no external, direct-access point. The data communicated on the private network may be optionally encrypted for further security. Depending on the frequency of collection and transmission of sensor measurements and other data, the private network may experience large bandwidth usage and be technologically designed and arranged to accommodate for such technological issues. Moreover, the computing system environment may also include a public network that may be accessible to remote devices. In some examples, a remote device (e.g., a remote device associated with a plant operator) may be located not in the proximity (e.g., more than one mile away) of the various sensor, measurement, and data capture systems (e.g., which may be located at or near the one or more plants $12a$-$12n$). In other examples, the remote device may be physically located inside a plant (e.g., a plant of the one or more plants $12a$-$12n$), but restricted from access to the private network; in other words, the adjective "remote," need not necessarily require the device to be located at a great distance from the sensor systems and other components. One or more other suitable networks may be used, such as the internet, a wireless network (e.g., Wi-Fi), a corporate Intranet, a local area network (LAN), a wide area network (WAN), and/or the like.

The diagnostic system 10 may be partially or fully automated. In one or more embodiments, the diagnostic system 10 may be performed by a computer system, such as a third-party computer system, remote from a plant of the one or more plants $12a$-$12n$ and/or the plant planning center. The diagnostic system 10 may include a web-based platform 18 that may send and/or receive information over a communication network (e.g., the internet). Specifically, the diagnostic system 10 may receive signals and/or parameters via the network 16, and may cause display (e.g., in real time, in substantially real time, after a slight delay, after a long delay) of related performance information on an interactive display device (e.g., interactive display device 20).

Using a web-based system may provide one or more benefits, such as improved plant performance due to an increased ability to identify and capture opportunities, a sustained ability to bridge plant performance gaps, and/or an increased ability to leverage personnel expertise and improve training and development. The method may allow for automated daily evaluation of process performance, thereby increasing the frequency of plant performance review with less time and effort from plant operations staff. Offline collection of data from the sensors cannot be collected in real-time, and increases the risk of the data containing significant errors due to, at least, sample integrity degradation or ambient exposure of the samples to surrounding environmental impacts. Offline collection of data from the sensors can also be plagued by time stamp and synchronization issues, which reduce process reliability and optimization.

The web-based platform 18 may allow one or more users to work with the standardized information, thereby creating a collaborative environment (e.g., for sharing best practices or for troubleshooting). The method may provide more accurate prediction and optimization results due to fully configured models, which may include, for example, catalytic yield representations, constraints, degrees of freedom, and/or the like. The models may be outcome based business models that can improve process unit control. Routine automated evaluation of plant planning and operation models may allow timely plant model tuning to reduce or eliminate gaps between prepared plant models and direct and specific plant performance. Implementing the method using the web-based platform 18 may allow for monitoring and/or updating multiple sites, thereby better enabling facility planners to propose realistic optimal targets. The web-based platform 18 can allow collection of data gathered from the sensors via the internet, and allow for real-time plant process control.

The diagnostic system 10 may comprise one or more computing platforms, which may comprise one or more communication interfaces configured to interface with one or more other computing platforms (e.g., via an interface module, a network); one or more databases; one or more processors; and/or memory storing computer-readable instructions that, when executed by the one or more processors, cause the one or more computing platforms to perform one or more actions or steps. In one or more embodiments, the diagnostic system 10 may be implemented as a computer program or suite of computer programs including instructions arranged such that when executed by one or more computers, the instructions cause the one or more computers to perform one or more functions described herein. One or more embodiments may comprise at least one computer-readable medium storing a computer program or at least one of the suite of computer programs. One or more embodiments may comprise an apparatus comprising at least one processor and memory storing instructions that, when executed by the at least one processor, cause the apparatus to perform one or more functions described herein. In one or more embodiments, the diagnostic system 10 may comprise a detection unit 22, an analysis unit 28, a visualization unit 30, an alert unit 34, an interface module 24, a server or computing device 14, a web-based platform 18, and/or one or more additional devices, platforms, or systems.

The diagnostic system 10 may comprise a detection unit 22 configured to detect a faulty condition or at least one a compositional measurement that is outside of a predetermined range of the refining or chemical process of at least one plant of the one or more plants $12a$-$12n$. In some refineries or chemical plants, various parameters or measurements might differ between different levels, pieces of equipment, processes, or other aspects of a plant (e.g., a plant of the one or more plants $12a$-$12n$). Consequently, diagnosing different process models being executed may depend on different parameters or measurements. In some embodiments, the detection unit 22 may automatically detect one or more faulty conditions or a compositional measurement that is outside of a predetermined range based on readings of the parameters or measurements in real-time. The detection unit 22 may generate one or more alerts associated with the detected one or more faulty conditions or a compositional measurement that is outside of a predetermined range.

The diagnostic system 10 may use process measurements to monitor the performance of chemical conversion units, separations units, and/or process devices.

The diagnostic system 10 may use process measurements from various sensor and monitoring devices to monitor conditions in, around, and on process equipment. Such sensors may include, but are not limited to, pressure sensors, differential pressure sensors, various flow sensors (including but not limited to orifice plate type, disc, venturi), temperature sensors including thermal cameras and skin thermocouples, capacitance sensors, weight sensors, gas chromatographs, moisture sensors, ultrasonic sensors, position sensors, timing sensors, vibration sensors, level sensors, liquid level (hydraulic fluid) sensors, and other sensors commonly found in the refining and chemical industry. Further, process laboratory measurements may be taken using sensors such as gas chromatographs, liquid chromatographs, distillation measurements, octane number measurements, and other laboratory measurements (see FIGS. 3 and 4). System operational measurements also can be taken to correlate the system operation to the rotating equipment measurements.

Gas chromatographs ("GC") are instruments used to perform gas chromatography analysis of samples. A GC can be a compositional sensor and used for determining feed and product compositions, degree of conversion to desired products or of specific feed constituents in plant operations. GC in the present disclosure can also refer to liquid chromatographs for performing liquid chromatography analysis of samples.

Compositional sensors directly and specifically analyze compositional data related to plant and are not model-dependent. Model-dependent sensing refers to analytical methods that are not based on a direct signal from the substance or process being analyzed. Model-dependent sensing comprises using physical properties, such as, but not limited to, viscosity, refractive index, specific gravity, or spectroscopic measurements to indirectly deduced chemical composition through data correlations. Compositional sensors provide composition and data beyond temperature, pressure, level, and flow. The data collected from compositional sensors can be used to improve reliability, efficiency, and profitability of a plant.

GC analysis can be performed using a compositional analysis to provide directly measured compositional data to be used for process control. The directly measured compositional data can be measured automatically, or in an automated way. The data collected from the compositional sensors has a reduced potential for ambient exposure or degraded sample integrity because the data can be transmitted in real time, according to one or more embodiments of the present disclosure.

In addition, sensors may comprise transmitters and deviation alarms. These sensors may be programmed to set off an alarm, which may be audible and/or visual.

Other sensors may transmit signals to a processor or a hub that collects the data and sends the data to a processor.

Sensor data, process measurements, and/or calculations made using the sensor data or process measurements may be used to monitor and/or improve the performance of the equipment and parts making up the equipment. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the process streams, such as corrosive species, oxygen, hydrogen, and/or water (moisture). Chemical sensors may utilize gas chromatographs, liquid chromatographs, distillation measurements, and/or octane number measurements. In another example, equipment information, such as wear, efficiency, production, state, or other condition information, may be gathered and determined based on sensor data. The collection of the sensor data and process measurements may be performed using an automated sampling of a process stream.

Sensor data may be automatically collected continuously, intermittently, or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a known problem area may be collected at a first interval, and data at a spot that is not a known problem area may be collected at a second interval. The data collection platform may be automated to continuously or periodically (e.g., every second, every minute, every hour, every day, once a week, once a month) transmit collected sensor data to interface module 24 via network 16, which may be nearby or remote from the one or more plants 12*a*-12*n*. Transmitting the collected sensor data to interface module 24 can be performed in real-time, which is less than 10 minutes from sampling the process stream, less than 5 minutes from sampling the process stream, less than 3 minutes from sampling the process stream, or less than 1 minute from sampling the process stream.

The detection unit 22 may identify a causal relationship that leads to finding a root cause of chemical process disruptions and/or poor process operations. For example, the detection unit 22 may identify one or more operational issues or faulty conditions or a compositional measurement that is outside of a predetermined range and prepare a systematic drill-down navigation to a set of potential root causes of the process disruptions and poor process operations.

The diagnostic system 10 may include an interface module 24 for providing an interface between the diagnostic system 10, the detection unit 22, the analysis unit 28, visualization unit 30, alert unit 34, one or more internal or external databases 26, and the network 16. The interface module 24 may receive data from, for example, plant sensors, parameters, and compositional measurements via the network 16, and other related system devices, services, and applications. The other devices, services, and applications may include, but are not limited to, one or more software or hardware components related to the one or more plants 12*a*-12*n*. The interface module 24 may also receive the signals and/or parameters (e.g., provided from one or more sensors) from a plant of the one or more plants 12*a*-12*n*, which may be communicated to one or more respective units, modules, devices, and/or platforms.

The diagnostic system 10 may comprise an analysis unit 28 configured to determine an operating status of the refinery or chemical plant to ensure robust operation of the one or more plants 12*a*-12*n*. The analysis unit 28 may determine the operating status based on the readings of parameters or measurements gathered by one or more sensors at a plant of the one or more plants 12*a*-12*n*. The parameters or measurements may relate to at least one of a process model, a kinetic model, a parametric model, an analytical tool, a related knowledge standard, and/or a best practice standard.

In one or more embodiments, the analysis unit 28 may generate a comprehensive process decision tree based on at least one of an expert knowledge or a causal relationship between the faulty condition or a compositional measurement that is outside of a predetermined range and the corresponding sensor signals, parameters, or measurements. Once the causal relationship is generated based on the decision tree, a human-machine interface ("HMI") may be used to graphically link the faulty condition or a compositional measurement that is outside of a predetermined range with the signals, parameters, or measurements. In one embodiment, high level process key performance indicators may be shown on the alert dashboard 32 and/or the display device 20.

In one embodiment, the analysis unit 28 may receive historical or current performance data from at least one plant of the one or more plants 12a-12n. The analysis unit 28 may use the historical or current performance data to proactively predict future events or actions. To predict various limits of a particular process and stay within the acceptable range of limits, the analysis unit 28 may determine target operational parameters of a final product based on one or more actual current operational parameters and/or one or more historical operational parameters (e.g., from a process stream, a heater, a temperature set point, a pressure signal, and/or the like).

In using the kinetic model or other detailed calculations, the analysis unit 28 may establish one or more boundaries or thresholds of operating parameters based on existing limits and/or operating conditions. Illustrative existing limits may include mechanical pressures, temperature limits, hydraulic pressure limits, and/or operating lives of various components. Other suitable limits and conditions may suit different applications.

In using the knowledge and best practice standard, such as specific know-hows, the analysis unit 28 may establish relationships between operational parameters related to a specific process. For example, the boundaries on a naphtha reforming reactor inlet temperature may be dependent on a regenerator capacity and hydrogen-to-hydrocarbon ratio. Furthermore, the hydrogen-to-hydrocarbon ratio may be dependent on a recycle compressor capacity.

The diagnostic system 10 may comprise a visualization unit 30 configured to display plant performance variables using the display device 20. The visualization unit 30 may display a current state of the plant of the one or more plants 12a-12n using an alert dashboard 32 on the display device 20, grouping related data based on a source of the data for meaningfully illustrating relationships of the displayed data. In this configuration, the user can quickly identify the information, and effectively gains insightful interpretation presented by the displayed data.

In one or more embodiments, the diagnostic system 10 may interface with the network 16, and perform the performance analysis of a given plant of the one or more plants 12a-12n. The diagnostic system 10 manages interactions between the operators and the present system by way of the HMI, such as a keyboard, a touch sensitive pad, a touchscreen, a mouse, a trackball, a voice recognition system, and/or the like. Other suitable interactive interfaces may suit different applications.

The display device 20 (e.g., textual and graphical) may be configured to receive an input signal from the diagnostic system 10. In one or more embodiments, the diagnostic system 10 may receive graphical and/or textual input or interactions from an input device, such as the HMI, using the alert dashboard 32. The signals and/or parameters may be received in the diagnostic system 10 and then transferred to the alert dashboard 32 of the display device 20 via a dedicated and/or wireless communication system. The display device 20 can be a mobile device.

The diagnostic system 10 may comprise an alert unit 34 configured to automatically generate a warning message based on the received signals, parameters, or measurements. Illustrative warning messages may include, but are not limited to, an email, a phone call, a text message, a voice message, an iMessage, an alert associated with a mobile application, or the like, such that selected technical service personnel and customers are informed of one or more faulty conditions or a compositional measurement that is outside of a predetermined range of the specific chemical refining or chemical process.

Figure 2:
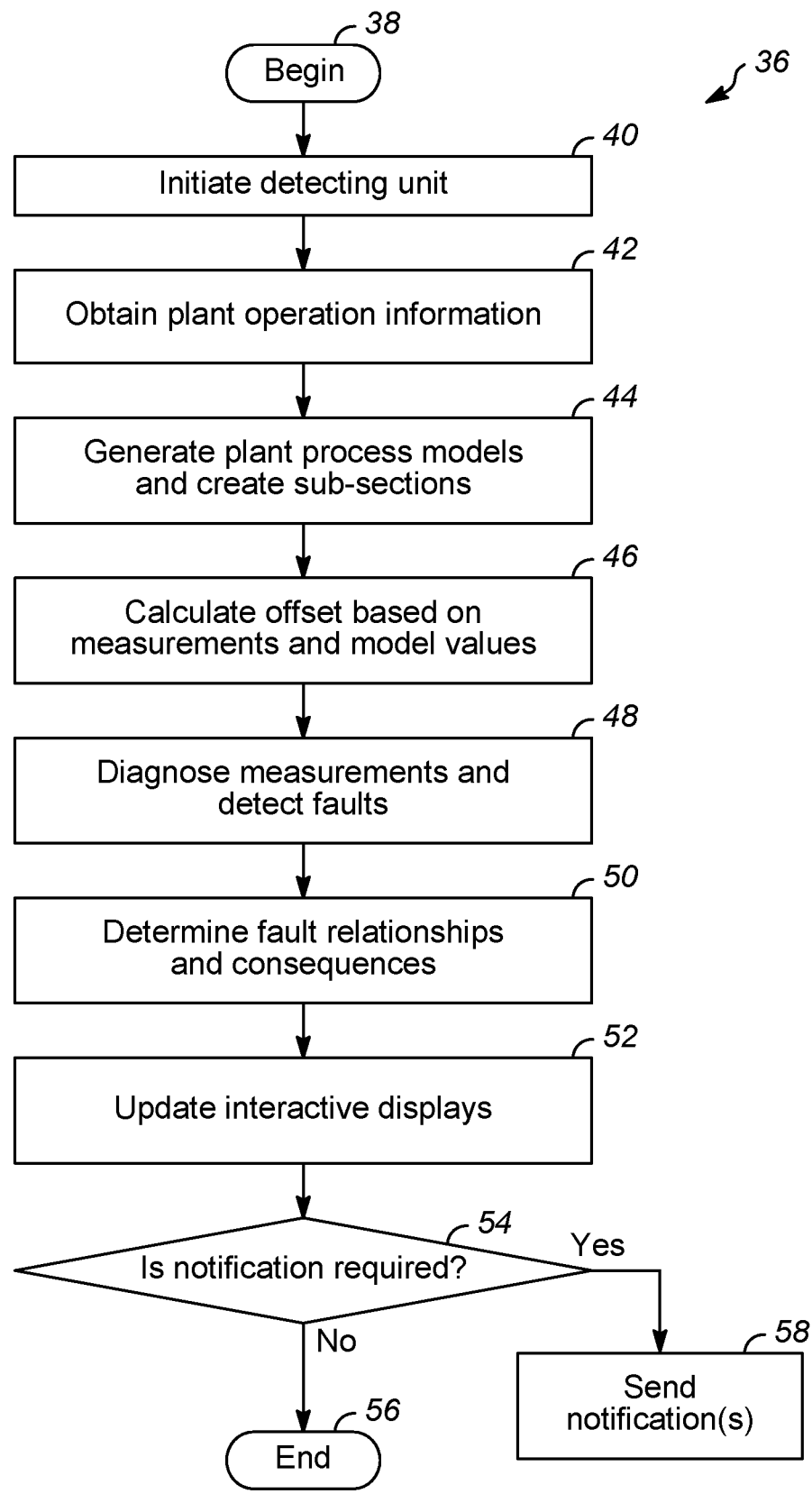
FIG. 2 depicts an illustrative flow diagram of processes in accordance with one or more embodiments of the present disclosure.

Turning now to FIG. 2, an illustrative flow diagram of one or more processes in accordance with one or more embodiments of the present disclosure is shown. One of skill in the art will recognize that the flow diagrams depicted throughout this disclosure may include one or more additional steps, repeat steps, may be performed without one or more steps, and/or may be performed in a different order than depicted.

FIG. 2 depicts a flow diagram for an illustrative operation 36 of the diagnostic system 10. In step 38, the method may begin.

In step 40, the method may initiate a detecting unit. In one embodiment, the detection unit 22 may be initiated by a computer system that is inside or remote from the plant 12a-12n. The method may be automatically performed by the computer system; however, the present disclosure is not intended to be so limited. One or more steps may include manual operations or data inputs from the sensors and other related systems, as desired.

In step 42, the method may obtain plant operation information. In an example operation, the detection unit 22 may receive at least one set of actual measured data from the plant 12a-12n on a recurring basis at a specified time interval, such as, for example, every 100 milliseconds, every second, every ten seconds, every minute, every two minutes, etc. The received data may be analyzed for completeness and corrected for gross errors. Then, the data may be corrected for measurement issues (e.g., an accuracy problem for establishing a simulation steady state) and/or overall mass balance closure to generate a duplicate set of reconciled plant data.

In step 44, a plant process model may be generated using the plant operation information. The plant process model may estimate or predict plant performance that may be expected based upon the actual, specific, and directly collected plant operation information. The plant process model results can be used to monitor the health of the plant 12a-12n and/or to determine whether any upset or poor measurement occurred. The plant process model may be generated by an iterative process that models various plant constraints to determine the desired plant process model.

The generated plant process model can further be divided into sub-sections, though this is not required in all methods. In an example method for creating sub-sections, a simulation may be used to model the operation of the plant 12a-12n. Because the simulation for the entire unit may be quite large and complex to solve in a reasonable amount of time, each plant 12a-12n may be divided into smaller virtual sub-sections, which may consist of related unit operations. An exemplary process simulation unit, such as a UNISIM Design Suite, is disclosed in U.S. Pat. No. 9,053,260, which is incorporated by reference in its entirety.

For example, in one or more embodiments, a fractionation column and its related equipment such as its condenser, receiver, reboiler, feed exchangers, and pumps may make up a sub-section. Some or all available plant data from the unit, including temperatures, pressures, flows, and/or laboratory data may be included in the simulation as Distributed Control System (DCS) variables. Multiple sets of the plant data may be compared against the process model, and model fitting parameter and measurement offsets may be calculated that generate the smallest errors.

In step 46, offsets may be calculated based on measurements and/or model values. Fit parameters or offsets that change by more than a predetermined threshold, and measurements that have more than a predetermined range of error, may trigger further action. For example, large changes in offsets or fit parameters may indicate the model tuning may be inadequate. Overall data quality for the set of data may then be flagged as questionable.

A measured value and corresponding stored value (which may be simulated or actual value collected from prior plant process data) may be evaluated for detecting an error or excess deviation based on a corresponding offset. In one or more embodiments, an offset may be detected when the measured information is not in sync with, the same as or in the range of the stored information used as the process model. The system may use evidence from a number of measurements and a process model to create the stored information.

In step 48, the operational status of the measurements may be diagnosed, e.g., based on at least one environmental factor, and a fault (or faults) may be detected by the detection unit 22. As discussed elsewhere herein, the example diagnostic system 10 may use one or more different models to determine the status of the plant and the presence of operating conditions that may be considered faults. A model used for detecting the faults can be a heuristic model, an analytical model, a statistical model, etc. In one or more example methods, the calculated offset between the feed and product information may be evaluated based on at least one environmental factor for detecting the fault of a specific measurement.

In step 50, the analysis unit 28 may determine fault relationships and consequences. Relationships between the faults can be determined from, for instance, expert knowledge, statistical analysis, or machine learning. In one or more embodiments, the analysis unit 28 may generate a comprehensive process decision tree based on at least one of an expert knowledge or a causal relationship between the faulty condition or a compositional measurement that is outside of a predetermined range and the corresponding sensor signals, parameters, or measurements.

In one or more embodiments, the analysis unit 28 can receive historical or current performance data from at least one of the plants 12a-12n to proactively predict future actions to be performed. To predict various limits of a particular process and stay within the acceptable range of limits, the analysis unit 28 may determine target operational parameters of a final product based on actual current and/or historical operational parameters, e.g., from a process stream, a heater, a temperature set point, a pressure signal, or the like.

In using the kinetic model or other detailed calculations, the analysis unit 28 may establish boundaries or thresholds of operating parameters based on existing limits and/or operating conditions. Illustrative existing limits may include mechanical pressures, temperatures, hydraulic pressures, compositions and/or operating lives of various components. Other suitable limits and conditions are contemplated to suit different applications.

In using the knowledge and best practice standard, such as specific know-hows, the analysis unit 28 may establish relationships between operational parameters related to the specific process. For example, the boundaries on a naphtha reforming reactor inlet temperature may be dependent on a catalytic regenerator capacity and/or a hydrogen-to-hydrocarbon ratio, which itself may be dependent on a recycle gas compressor capacity.

Next, in step 52, the visualization unit 30 may cause one or more displays, such as the display device 20, to be updated. The display device 20 may be configured for graphically linking the faulty condition or a compositional measurement that is outside of a predetermined range detected by the detection unit 22 with the plurality of readings of parameters or measurements. The visualization unit 30 may display a current state of the plant 12a-12n, e.g., the operating status of the plant with the readings of parameters or measurements, using an alert dashboard 32 on the display device 20, grouping related data based on a source of the data for meaningfully illustrating relationships of the displayed data.

The visualization unit 30 may update one or more screens of the display device 20 with context information that is provided by diagnosing measurements and detecting faults and by determining fault relationships and consequences. For example, once the causal relationship is generated based on the decision tree, a human machine interface (HMI) may be used to graphically link the faulty condition or a compositional measurement that is outside of a predetermined range with the signals, parameters, or measurements. The vizualization unit 30 may generate an alert. In some example methods, high level process key performance indicators (KPI) may be shown on the display device 20. If the diagnostic system 10 determines that conditions exist that might cause a key performance indicator to eventually be put at risk, the updated display devices 20 may indicate this information, provide context for what variables or factors are presenting this risk, and/or provide advice as to how to address the risk. In this configuration, a user may quickly identify the information, in real-time, and effectively gain insightful interpretation presented by the displayed data.

In one or more embodiments, the diagnostic system 10 may interface with the network 16, and perform the performance analysis of the given plant 12a-12n. The diagnostic system 10 may manage interactions between the operators and the present system by way of the HMI, such as a keyboard, a touch sensitive pad or screen, a mouse, a trackball, a voice recognition system, and the like. Other suitable interactive interfaces are contemplated to suit different applications.

In some embodiments, the display device 20 (e.g., textual and graphical) may be configured for receiving an input signal from an input device and/or the diagnostic system 10. In one embodiment, display may receive input from an input device, such as the HMI, the input indicating a graphical or textual interaction with the diagnostic system 10, via the alert dashboard 32. The signals and/or parameters may be generally received in the diagnostic system 10 and then transferred to the alert dashboard 32 of the display device 20 via a dedicated communication system. The display device 20 may be a mobile device.

The diagnostic system 10 may determine at step 54 whether to send one or more notifications. In one or more example embodiments, the diagnostic system 10 can be configured to set up notifications to individual users. Alternatively or additionally, users can subscribe to notifications. If a measurement is determined to be within a fault status or undesired status, a notification (e.g., an alert) may be sent to a user device (e.g., of an operator) at step 58. The diagnostic system 10 may include an alert unit 34 configured for automatically generating alerts such as a warning message for the operators and/or other related systems coupled to the present system based on the received signals, parameters, or measurements. Exemplary warning messages may include, but are not limited to, an email, a text message, a voice message, an iMessage, a smartphone alert, a notification from a mobile application, or the like. The alert may provide information related to one or more faulty conditions or a compositional measurement that is outside of a predetermined range of the specific chemical refining or chemical process.

After the notification is sent (step 58), or if no notification is required (step 54), the method ends at step 56. The method may be repeated as needed Turning now to FIG. 3, an illustrative process flow diagram 60 for an example plant showing example sensor 62 locations in accordance with one or more embodiments of the present disclosure. At least one sensor 62, including gas chromatograph or liquid chromatograph, or gas-liquid chromatograph sensor, can be located anywhere in the plant process. The at least one sensor 62 can be associated with key unit operations 64, such as a reactor, including hydroprocessing reactors, cracking reactors, reformers, furnaces and catalyst regenerators, a separations unit, including fractionation columns and distillation columns, furnaces, cooling towers, and/or boilers. The at least one sensor 62 can be located within or positioned near key unit operations 64. The at least one sensor 62 can also be associated with, for example located within or positioned near, a process device 66, such as a valve, a duct, pipe or line, a compressor, a pump, a turbine, a separator, a drum, vessel or tank, and/or heat exchanger. The at least one sensor 62 can also be located or positioned upstream, midstream, or downstream of the plant process.

Figure 3:
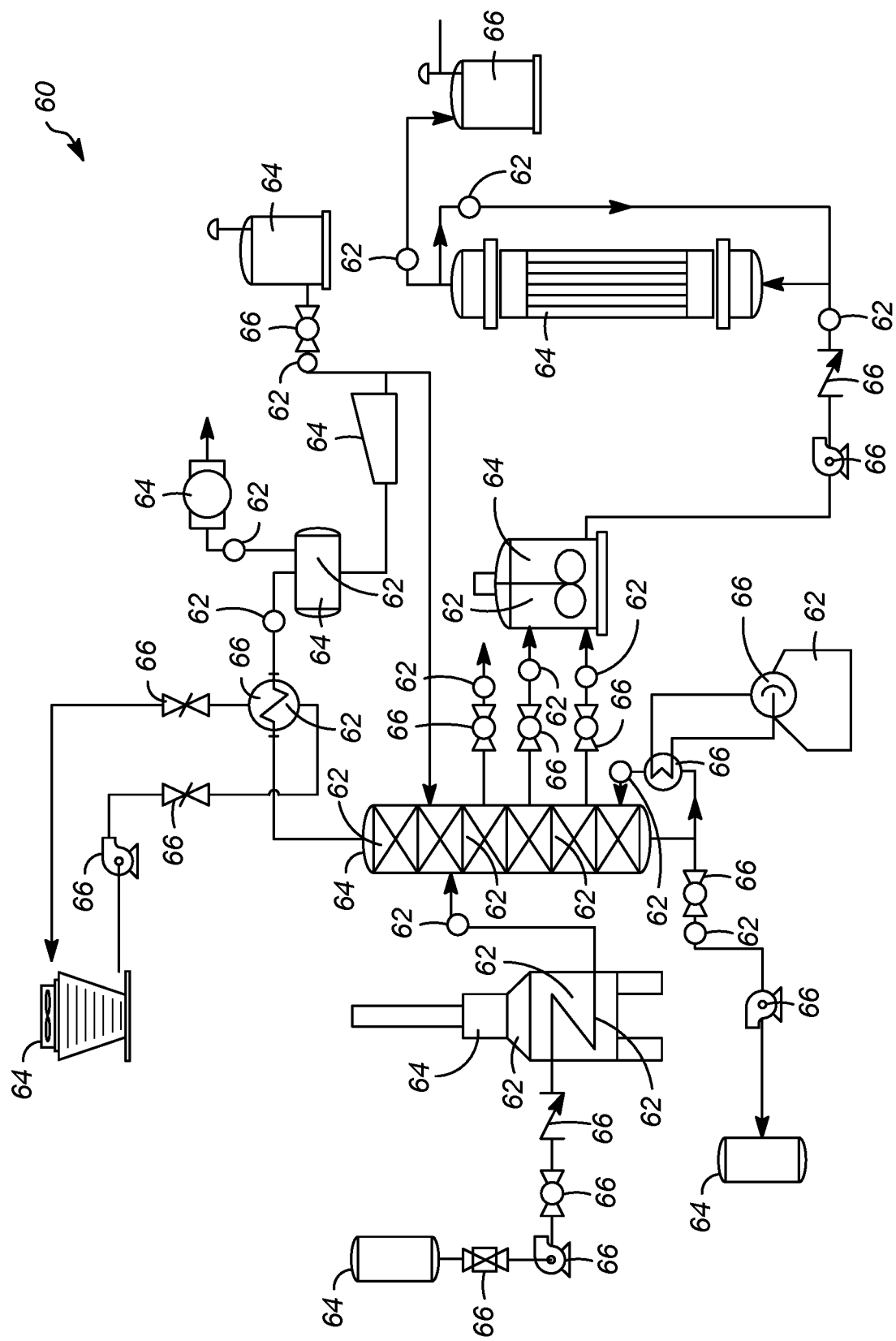
FIG. 3 depicts an illustrative process flow diagram for an example chemical plant showing example sensor locations in accordance with one or more embodiments of the present disclosure.

FIG. 3 is presented as an example only, and this disclosure is not intended to be limited to an oil refining process. The embodiments in this disclosure can also be applied to a plant, such as a chemical plant that uses natural gas as a feedstock. Typically, key unit operations 64 are in fluid communication with each other, and at least one processes device 66 can be placed between each of the key unit operations 64. At least one sensor 62 can be located in between any key unit operation 64 that are in fluid communication with each other, a key unit operation 64 and a process device 66 that are in fluid communication with each other, or in between any process devices 66 that are in fluid communication with each other. At least one sensor 62 and be placed upstream or downstream of any key unit operation 64. At least one sensor 62 can also be integrated in or connected to at least one process device 66, at least one instrument, or key unit operation 64, or integrated within process equipment in the plant.

Figure 4:
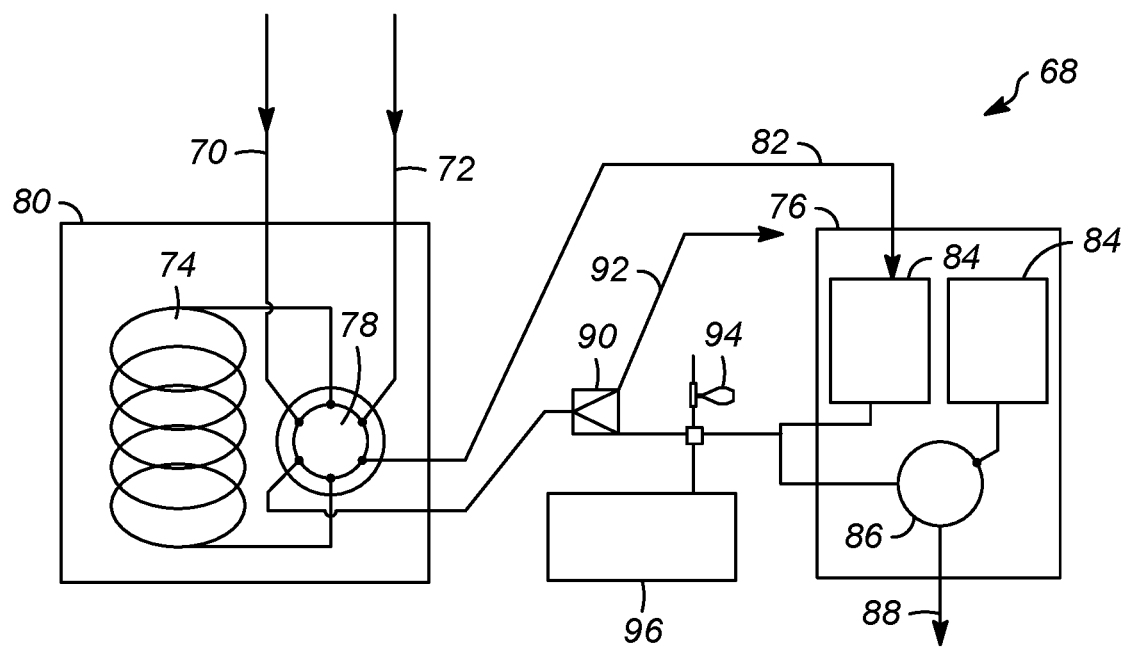
FIG. 4 depicts a top view of micro gas chromatographs in accordance with one or more embodiments of the present disclosure.

Turning now to FIG. 4, a top view of micro gas chromatographs 84 in accordance with one or more embodiments of the present disclosure is shown. A micro gas chromatograph ("micro GC") 84 comprises the same components as a GC, but the components are miniaturized, particularly the separation column(s), to increase portability, decrease power consumption, and increase the speed of analysis. Micro GC 84 in the present disclosure can also refer to micro liquid chromatographs for performing liquid chromatography analysis of samples. A micro GC 84 can provide rapid delivery of analytical data because a micro GC 84 separates analyte compounds at a higher speed compared to conventional GCs, particularly capillary GCs. The higher speed allows for faster analysis of data that can be up to 25 times faster than conventional GC analysis.

In one embodiment of the present disclosure, a micro GC 84 or a micro GCxGC 76 analysis can be used to directly measure compositions of process streams comprising certain substances to be analyzed. GCxGC is a multidimensional gas chromatography technique that can utilize at least two different columns with two different stationary phases. In GCxGC, effluent from the first dimension column is diverted to the second dimension column via a modulator. The modulator quickly traps, then "injects" the effluent from the first dimension column onto the second dimension. This process creates a retention plane of the 1st dimension separation x 2nd dimension separation. A micro GCxGC comprises the same components as a GCxGC, but the components are miniaturized, to increase portability, decrease power consumption, and increase the speed of analysis. A single micro GC 84 or micro GCxGC 76 can be adapted to a range of analysis needs for various process streams. A standard GC apparatus can be substituted for a micro GC apparatus, or a standard GCxGC apparatus can be substituted for a micro GCxGC apparatus.

As shown in FIG. 4, in one embodiment of the present disclosure, a plurality of micro GCs 84, a plurality of micro GCxGCs 76, or a combination thereof, may be employed, either in parallel, linear series, non-linear series, or combined in a single sensing instrument. A plurality of micro GC 84 or micro GCxGC 76 can comprise at least two micro GCs 84, micro GCxGCs 76, or a combination thereof, arranged to allow fluid communication between or among the micro GCs 84, micro GCxGCs 76, or combination thereof. The plurality of micro GCs 84, micro GCxGCs 76, or combination thereof, can allow for improved quality control of measurement processes. The overlapping analytical data received from the plurality of micro GCs 84, micro GCxGCs 76, or combination thereof, can be compared and provide a means for detecting measurement errors in a specific micro GC 84 or micro GCxGC 76 apparatus housed within the series or single sensing instrument employed in the plant.

In one embodiment of the present disclosure, the plurality of micro GCs 84, micro GCxGCs 76, or combination thereof, can be confined to a single circuit board or a silicon chip based apparatus, and can be etched into a chip. A sample stream inlet 70 (which can be a sample gas or liquid supply) can be integrated into the silicon chip-based apparatus. A He purge gas inlet 72 can also be integrated into the silicon chip-based apparatus. The sample gas inlet 70 allows a portion of a stream flowing through or from a plant or refinery to enter a micro GC characterization system 68. The sample gas inlet 70 and He purge gas inlet 72 (if desired) can be in fluid communication with a switching valve 78, such as a six-port switching valve. The gas entering the switch valve 78 can be directed into a column 74, such as a trapping column. The sample stream can exit the column 74 and enter the switching valve 78, which can direct the gas to a micro GC 84 or micro GCxGC 76 though a line 82. Line 82 can be a capillary tube. The switching valve 78 and column 74 can be located inside an oven 80 to control the temperature of the gas and column 74.

A micro GC vacuum pump 86 can be built in to the micro GCxGC 76 to assist with pulling the gas into the micro GC 84 or micro GCxGC 76. The micro GC vacuum pump can comprise a pump vent 88.

The switching valve 78 can be in fluid communication with a flow selection valve 90. The flow selection valve 90 can be in fluid communication with a needle valve 94 (if desired) that is located between a vacuumeter 96 and flow selection valve 90. The flow selection valve 90 can control switching between enrichment and sample transfer to the micro GC 84 or micro GCxGC 76. The needle valve 94 can be used to adjust the pressure drop of the column 74 to the desired value.

In one embodiment of the present disclosure, a micro GC characterization system can be implemented downstream in the plant process, such as downstream of a feed tank containing a material that has been refined and is not in its natural state. Analysis methods, such as the UOP method 690™ standard and UOP method 744™ standard can be miniaturized and used in combination with each other or a third method to identify aromatic isomer distribution for A6-A10, non-aromatic isomer distribution for C5-C8, carbon number, and carbon type information across the entire sample boiling range. All three methods do not need to be used at once. Micro UOP method 690 can be used to identify non-aromatic isomer distribution data for C5-C8. Micro UOP method 744 can be used to identify aromatic isomer distribution for A6-A10. The third method can be used to identify carbon number and carbon type information across the entire sample boiling range by utilizing GCxGC or micro GCxGC ("GCxGC method"). Each of these methods can be used with GCxGC or micro GCxGC. Combining the data collected from all three methods provides a full characterization report for a substance, such as for naphtha range material. One method, however, may provide all the data needed, and there may not be a need to combine any methods. Combining at least two of these methods can provide an overlap of data, fill in data gaps that one of the methods does not provide, and allow for improved quality control. Data quality can be checked by looking at common components between each method. Table 1 below provides an example of what substances can be analyzed using different combinations of micro UOP method 690, micro UOP method 744, and GCxGC method. These methods can be found on the ASTM International website and the path to find these methods is currently Products and Services/Standards & Publications/Standards Products.

TABLE 1

| Substance to Be Detected | Method or Method Combination |
|---|---|
| Benzene | Micro UOP method 690, Micro UOP 744, and GCxGC |
| Toluene | Micro UOP method 690, Micro UOP 744, and GCxGC |
| Xylenes | Micro UOP method 744 and GCxGC |
| Cyclohexane | Micro UOP method 690 and GCxGC |
| Hexane | Micro UOP method 690 and GCxGC |
| Heptane | Micro UOP method 690 and GCxGC |
| Total A9 | Micro UOP method 744 and GCxGC |
| Total A10 | Micro UOP method 744 and GCxGC |
| Xylene Isomers | Micro UOP method 744 |

Analysis methods quantify the chemical composition of a substance. The UOP method 690 is used to determine C8 and lower boiling paraffins and naphthenes in hydrocarbons containing less than 2 mass-% olefins (see Note 1) having a maximum final boiling point of 260° C. Benzene and toluene are also determined. Certain non-aromatic components of interest are reported as composites and C8 aromatics are not determined.

The UOP method 744 is used to determine individual C6 through C10 aromatic compounds in petroleum distillates or aromatic concentrates having a final boiling point of 210° C. or lower. C11 and heavier aromatics are reported as a group. C10 and heavier non-aromatics may interfere with the determination of benzene and toluene. When this occurs, benzene and toluene can be determined by ASTM Methods D 5443, D 5580, D 6729, or D 6839, or UOP Method 690. Other applications for this method include the assay of any C10 or lower boiling aromatics, such as benzene, toluene, mixed xylenes, etc. This method may also be used to provide a distribution of C8 aromatics and/or C9 and heavier aromatics to a value determined by a different method.

It is important to recognize that this disclosure has been written as a thorough teaching rather than as a narrow dictate or disclaimer. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

The foregoing description of illustrated embodiments, including what is described in the Abstract and the Summary, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

Thus, although the foregoing disclosure has been described in some detail by way of illustration and example for purposes of clarity and understanding, it will be obvious that certain changes and modifications may be practiced within the scope of the disclosure, as limited only by the scope of claims.

What is claimed is:

1. A diagnostic system comprising:
   a plant comprising: at least one chemical conversion unit, separation unit, and process device;
      at least one process device is a line in fluid communication with said at least one chemical conversion unit or at least one separation unit; and
      one or more sensors associated with the at least one chemical conversion unit, the at least one separation unit, or the at least one line in fluid communication with said at least one chemical conversion unit or at least one separation unit, wherein at least one of the sensors is selected from a group of a GC, GCxGC, micro GC, micro GCxGC, or combinations thereof;
a detection unit comprising:
 a communication interface; and
 a memory storing executable instructions that, when executed by one or more processors, cause the detection platform to:
  receive, via the communication interface, sensor data from the one or more sensors of the plant, the sensor data comprising a plurality of readings of compositional measurements associated with the chemical conversion unit, the separation unit, or one or more process devices of the plant; and
  based on the sensor data, detect at least one compositional measurement that is outside of a predetermined range of a process of the plant based on the plurality of readings of measurements being associated with the at least one compositional measurement that is outside of a predetermined range;
an analysis unit comprising:
 a communication interface;
 one or more processors; and
 a memory storing executable instructions that, when executed by the one or more processors, cause the analysis platform to:
  determine an operating status of the plant based on the plurality of readings of measurements associated with the chemical conversion unit, the separation unit, or one or more process devices of the plant;
a visualization unit comprising:
 a communication interface;
 one or more processors; and
 a memory storing executable instructions that, when executed by the one or more third processors, cause the visualization platform to:
  generate an alert comprising a display of the operating status of the plant and the plurality of readings of measurements associated with the at least one chemical conversion unit, the at least one separation unit, or the at least one process devices of the plant, the alert illustrating relationships between the related data, wherein the alert is generated within 10 minutes of the first communication interface receiving sensor data from the at least one of the sensors selected from the group of a GC, GCxGC, micro GC, or micro GCxGC.

2. The system of claim 1, wherein the memory of the analysis platform stores the sensor data from the at least one of the sensors selected from the group of a GC, GCxGC, micro GC, or micro GCxGC and further executable instructions that, when executed by the one or more processors, cause the analysis platform to:
 execute at least one analysis method for analyzing the sensor data to characterize the composition of a flow in the line in fluid communication with said at least one chemical conversion unit or at least one separation unit,
 analyze the data using the at least one analysis method,
 characterize the composition of the flow line in fluid communication with said at least one chemical conversion unit or at least one separation unit; and
 generate the plurality of readings of measurements associated with the at least one analysis method executed.

3. The system of claim 1, further comprising:
 the visualization unit memory storing executable instructions that, when executed by the one or more processors, cause the diagnostic system to:
  communicate a process adjustment for the at least one chemical conversion unit, at least one separation unit, or the at least one line based on respective sources of the related data, or relationships between the related data; and
  implement the process adjustment to change the at least one compositional measurement that is outside of a predetermined range into at least one desired compositional measurement.

4. The system of claim 1, wherein at least two of the sensors are selected from the group of a GC, GCxGC, micro GC, micro GCxGC, or combinations thereof.

5. The system of claim 1, wherein the alert is generated within 3 minutes of the first communication interface receiving sensor data from the at least one of the sensors selected from the group of a GC, GCxGC, micro GC, or micro GCxGC.

6. The system of claim 1, wherein the alert is generated on a display of a mobile device.

7. The system of claim 2, wherein the further executable instructions that, when executed by the one or more processors, cause the analysis platform to:
 execute at least two analysis methods selected to analyze the sensor data to characterize the composition of a flow in the line in fluid communication with said at least one chemical conversion unit or at least one separation unit,
 analyze the data using the at least two analysis methods selected,
 characterize the composition of the flow line in fluid communication with said at least one chemical conversion unit or at least one separation unit;
 generate the plurality of readings of measurements associated with the at least two methods executed; and
 compare overlapping data from the at least two methods selected.

8. The system of claim 4, wherein the at least two of the at least one of the sensors are selected from the group of a GC, GCxGC, micro GC, micro GCxGC, or combinations thereof are housed within a single sensing instrument.

9. The system of claim 4, wherein the at least two of the sensors are located downstream in the plant.

10. The system of claim 8, wherein the single sensing instrument comprises at least one separation column etched into a chip.

11. A method for utilizing diagnostic system for a plant comprising:
 receiving, by one or more computing devices in a detection unit, sensor data from one or more sensors of a plant, the sensor data comprising a plurality of readings of measurements associated with at least one chemical conversion unit, separation unit or process device of the plant, wherein at least one of the sensors is selected from a group of a GC, GCxGC, micro GC, micro GCxGC, or combinations thereof,
 analyzing, in an analysis unit, the sensor data using at least one analysis method selected;
 generating, in the analysis unit, output from the analysis using the at least one analysis method selected;
 determining, in the analysis unit, an operating status of the plant based on report of the output generated; and
 generating, in a visualization unit, an alert comprising a display of the operating status of the plant executing at least two analysis methods are selected to analyze the sensor data; analyzing the data using the at least two analysis methods selected; generating the plurality of readings of measurements associated with the at least two analysis methods executed; and comparing overlapping data from the at least two methods selected.

12. The method of claim 11, wherein at least two of the one or more sensors are selected from a group of a GC, GCxGC, micro GC, micro GCxGC, or combinations thereof.

13. The method of claim 11, further comprising:
storing executable instructions on a memory that, when executed by one or more processors,
communicating a process adjustment for the at least one chemical conversion unit, separation unit, or process device based on respective sources of the related data, or relationships between the related data; and
implementing the process adjustment to change the at least one compositional measurement that is outside of a predetermined range into at least one desired compositional measurement.

14. The method of claim 12, wherein the at least two of the one or more sensors are located downstream in the plant.

15. The method of claim 13, further comprising generating the alert within 10 minutes of receiving the sensor data.

16. The method of claim 13, further comprising generating the alert within 3 minutes of receiving the sensor data on the display of a mobile device.

* * * * *

UNITED STATES PATENT AND TRADEMARK OFFICE
CERTIFICATE OF CORRECTION

| | | |
|---|---|---|
| PATENT NO. | : 12,019,428 B2 | Page 1 of 1 |
| APPLICATION NO. | : 17/194842 | |
| DATED | : June 25, 2024 | |
| INVENTOR(S) | : Wharton Sinkler et al. | |

It is certified that error appears in the above-identified patent and that said Letters Patent is hereby corrected as shown below:

On the Title Page

Column 1, after Prior Publication Data
US 2021/0200195 A1 Jul. 1, 2021
Insert: --Related U.S. Application Data
Provisional application No. 63/022,029, filed on May 8, 2020.--

Signed and Sealed this
Twelfth Day of August, 2025

Coke Morgan Stewart
*Acting Director of the United States Patent and Trademark Office*